Figures 1, 2, 3:
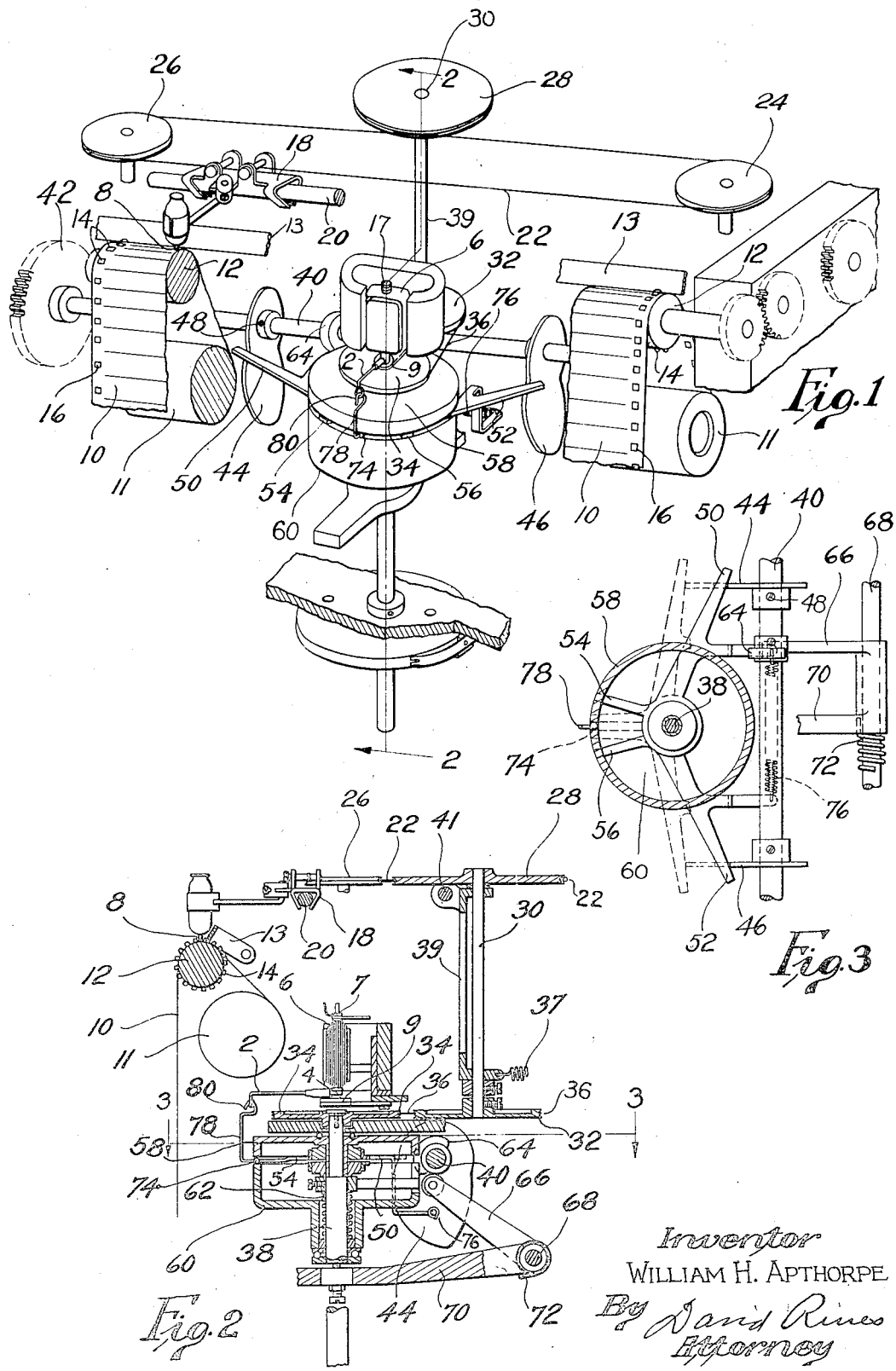

Dec. 26, 1933.    W. H. APTHORPE    1,940,834
CONTROLLER
Filed July 30, 1931

Inventor
WILLIAM H. APTHORPE
By David Rines
Attorney

Patented Dec. 26, 1933

1,940,834

UNITED STATES PATENT OFFICE 1,940,834

CONTROLLER

William Herbert Apthorpe, London, England, assignor to Cambridge Instrument Company, Limited, London, England, a corporation of Great Britain Application July 30, 1931, Serial No. 554,031, and in Great Britain February 12, 1931

11 Claims. (Cl. 74—14)

The present invention relates to controllers, and more particularly to recorder-movement controllers.

The invention will be explained more fully in connection with the accompanying drawing, in which Fig. 1 is a perspective view, with parts broken away, illustrating the invention in its preferred form; Fig. 2 is a section taken upon the line 2—2 of Fig. 1, looking in the direction of the arrows; and Fig. 3 is a section taken upon the line 3—3 of Fig. 2, looking in the direction of the arrows.

An electric meter or other instrument of any well known type is shown provided with a galvanometer pointer or other deflecting member 2 that is caused to move back and forth in response to varying conditions, such as those caused by a varying electric current flowing in a moving coil or winding 6. The galvanometer structure illustrated is of the pivoted galvanometer type, the pivots being shown at 7 and 9, but the invention is not limited thereto, as suspended or other types of instruments might also be employed. A chief object of the invention is to provide a novel system and apparatus for relaying the movement of the movable pointer 2, or of any other similar moving member, without taking a substantial amount of power from the instrument.

The relayed movement may be utilized for many purposes, such as to rotate the contact arm of a rheostat or other control device (not shown), but is illustrated herein, for concreteness, as driving a recording pen or reading indicator 8 over a moving record sheet 10. The sheet 10, as it is advanced over a rotating roll 12 from a roll 11, is held against the roll 12 by a guide plate 13. The roll 12 is rotated at constant, or any other desired, speed, in any desired manner, as by clockwork, and the advance of the record sheet 10 over the rotating roll 12 is effected by means of sprocket teeth 14 fitting into corresponding openings 16 provided in the record sheet 10. As the pen 8 travels, in response to movements of the pointer 2, back and forth over the moving record sheet 10, it leaves on the record sheet a record curve that has some correspondence to the movements of the pointer.

The pen 8 is carried by a holder 18 that is slidably actuated back and forth in opposite directions along a guide rod 20, perpendicular to the direction of advance of the record sheet 10, by an endless belt 22. The belt 22 passes over idler pulleys 24 and 26 and, after crossing, around an actuating pulley 28 that is in the same plane with the idler pulleys 24, 26. The pulley 28 is mounted upon the upper end of a turnable rod or spindle 30, journaled in a support 39 that is pivoted about a horizontal pivot 41. The lower end of the spindle 30 is provided with a pulley 32 that is driven from a pulley 34, coplanar therewith, by means of an endless belt 36. The belt 36 may be tensioned by means of a tension coil spring 37 pulling upon the support 39, to hold it in a pivotal position as far to the right (as viewed in Fig. 2) as the belt 36 will permit. The pulley 34 is keyed to a shaft 38 that is coaxial with the pivots 7 and 9 of the pointer 2, though a certain degree of disalinement is not harmful. To actuate the pen 8 back and forth over the paper 10, therefore, it is merely necessary to drive the shaft or spindle 38. It will now be explained, therefore, how the movement of the shaft or spindle 38 is controlled from and proportioned by the deflecting movements of the pointer 2.

A cup-shaped, clutch, disc member 58 is fixed to the shaft 38 and a cooperating cup-shaped, clutch disc member 60 is slidable thereon, though held against rotation with respect thereto. The cup-shaped member 60 is normally biased downward, away from the cup-shaped member 58, by a spring 62 coiled about the shaft 38. Once during each rotation of a shaft 40, that is rotated at constant speed from a motor-driven or other gear 42, or from any other convenient source of power, a cam 64, that is fixed thereto, engages one arm 66 of a bell-crank lever that is pivoted at 68, thus forcing the other bell-crank-lever arm 70 upward. This upward movement effects a corresponding upward movement of the cup-shaped member 60. The cam 64 is so shaped, however, that as the shaft 40 continues to rotate, it allows the arms 66 and 70 to be forced downward against the action of the spring 72, coiled about the pivot shaft 68, forces the bell-crank-lever arm 70 downward again, permitting the spring 62 to return the cup-shaped member to its lower position. The cup-shaped member occupies its uppermost position but momentarily.

At that moment when the cup-shaped member 60 occupies its upper position, however, it clamps a clutch ball 74 against the cup-shaped member 58. The two cup-shaped members 58 and 60 and the ball 74 become thus momentarily rigidly bound together as a unit. Any force exerted at this time upon the ball 74, either from the left or from the right, will cause the ball 74 to move correspondingly to the right or the left, carrying with it both cup-shaped members 58 and 60 and thus causing the partial rotation of the shaft 38 upon which the cup-shaped members 58 and 60 are mounted.

Such force upon the ball 74, to the right or the left, as the case may be, is adapted to be exerted by arms 54 and 56, respectively, if the ball 74 happens to occupy any but its central or neutral position. The arms 54, 56, disposed between the cup-shaped members 58 and 60, constitute corresponding arms of two bell-crank levers, the other arms of which are indicated at 50 and 52. The arms 50 and 52 are adapted, once in each cycle of rotation of the shaft 40, to be engaged by two cams 44 and 46, of the same size and shape, and that are secured to the shaft 40 in any approved manner as by set screws 48.

The cams 44 and 46 and the bell-crank levers 50, 54 and 52, 56 are so designed that, when the cams 44 and 46 occupy the dotted-line positions of Fig. 3, the bell-crank-lever arms 54, 56 shall return the ball 74 to its neutral or central position once corresponding to each rotation of the shaft 40. As soon as the cams 44 and 46 travel beyond the said dotted-line positions, a spring 76 pulls the bell-crank lever arms 54 and 56 into their normal positions, out of engagement with the ball 74. The bell-crank-lever arms 50, 52 are, however, kept by the spring 76 always in engagement with the respective cams 44, 46.

Once during each rotation of the shaft 40, therefore, the bell-crank-lever arms 54 and 56 will cause the ball 74 to return to its central position if it has, in the meantime, become deflected therefrom by the movements of the pointer 2, as presently to be described. Each time that the ball 74 becomes thus returned to its central position, the shaft 38 is turned by the cup-shaped members 58 and 60 to a degree dependent upon the amount by which the ball 74 had thus become displaced from its central position and, therefore, upon the amount of displacement of the pointer 2.

It remains now to describe how the movements of the ball 74 from its central position are controlled in accordance with the deflecting movements of the pointer 2. The ball 74 is carried at the lower end of a stirrup 78, the upper end of which is very loosely connected at 80 in an opening at the extreme free end of the pointer 2. Because of this very loose connection, the stirrup 78 is free at all times to move to the right and to the left, in response to corresponding movements of the pointer 2, but permitting a free movement of the pointer 2, without binding, even though the ball 74 should happen momentarily to be clamped by the clutch discs 58 and 60. It is thus impossible to injure the instrument.

In operation, assuming that the pointer 2 has been deflected toward the right, the ball 74 will likewise become deflected toward the right, and will then become clamped, in this deflected position, by the cup-shaped members 58 and 60. The bell-crank-lever arms 54 and 56 will thereupon return the ball 74 to its central position, effecting a slight turning of the cup-shaped members 58 and 60 and of the shaft 38 as a unit. As soon as the cup-shaped member 60 is actuated downward by the spring 62, the ball 74 becomes released, and is thereupon left free to become deflected again in response to a further deflecting movement of the pointer 2. The turning movement of the pointer 2 is thus constantly converted into a corresponding, proportional turning movement of the shaft 38. Though the ball 74 is essentially a part of the sensitive pointer 2, the power is thus transmitted through a very simple and relatively inexpensive mechanical arrangement, but without any stress upon the pointer 2.

The operation of the bell-crank levers 50, 54 and 52, 56 is so timed by the cams 44, 46, and the operation of the cup-shaped members 58, 60 is so timed by the cam 64, that the pointer 2 is free more than half the time. The pointer 2 is itself at no time held clamped against movement. The actual operating range is about twenty degrees on each side of the center; but if the cup-shaped members 58 and 60 should, under abnormal conditions, be rotated through a considerable angle, no harm can come to the instrument, for the forces are of the same nature as when the pointer is actuated by the galvanometer coil or winding 6. The instrument pivots are uninjured, particularly as the pivots are preferably, as before stated, in substantial alinement with the shaft 38. The clamping-time cycle, of course, is suitably timed to the galvanometer or other instrument period.

The use of the ball 74 reduces sticking to a minimum, its weight and shape being such that, even with greasy surfaces on the clamping cup-shaped members, it will easily free itself when the clamping action is released.

In most uses, the load recorded is shown by the indicator 8 or a target attached thereto for indicating the reading, while the pointer 2 merely indicates the departure from balance in some system such as a Wheatstone bridge.

Modifications will occur to persons skilled in the art, and all such are considered to fall within the spirit and scope of the invention as defined in the appended claims.

What is claimed is:

1. A device of the class described comprising a shaft; a member pivoted to move freely of the shaft substantially about the axis of the shaft, means responsive to varying conditions for moving the member about its pivot to varying degrees, and means for causing the turning of the shaft to a degree predetermined by the degree of pivotal movement of the member.

2. A device of the class described comprising a shaft, a clutch disc fixed to the shaft, a second clutch disc slidable along the shaft and fixed to rotate therewith, a member pivoted to move freely of the shaft substantially about the axis of the shaft, means for moving the member about its pivot, means for clutching the discs together, and means for actuating one of the clutch discs to cause the turning of the shaft to a degree predetermined by the degree of pivotal movement of the member.

3. A device of the class described comprising a shaft, a clutch disc fixed to the shaft, a second clutch disc slidable along the shaft and fixed to rotate therewith, an instrument having a deflecting member, a clutch ball constrained to follow the movement of the deflecting member and disposed between the clutch discs, means for periodically sliding the slidable disc toward and from the fixed disc to cause the discs to become first clutched together through the ball and then unclutched, and means for periodically returning the ball with the discs clutched thereto to a neutral position after the ball has become displaced from the neutral position in response to the pivotal movement of the deflecting member.

4. A device of the class described comprising a shaft, a member, means responsive to varying conditions for moving the member to varying degrees, a clutch element for the shaft loosely connected with the member so as freely to follow the movement of the member, and means for actuating the clutch element to a degree predetermined by the degree of movement of the member to cause the turning of the shaft to a degree determined by the degree of movement of the member.

5. A device of the class described comprising a shaft, a clutch disc fixed to the shaft, a second clutch disc slidable along the shaft and fixed to rotate therewith, a deflecting member having an indicator pivoted to move freely substantially about the axis of the shaft, a clutch ball loosely suspended from the indicator so as freely to follow the movement of the deflecting member and disposed between the clutch discs, means for periodically sliding the slidable disc toward and from the fixed disc to cause the discs to become first clutched together through the ball and then unclutched, and means for periodically returning the ball with the discs clutched thereto to a neutral position after the ball has become displaced from the neutral position in response to the pivotal movement of the deflecting member.

6. A device of the class described comprising a shaft, a clutch disc fixed to the shaft, a second clutch disc slidable along the shaft and fixed to rotate therewith, an instrument having an indicator pivoted to move freely substantially about the axis of the shaft, a clutch ball loosely suspended from the indicator so as freely to follow the movement of the indicator and disposed between the clutch discs, a constantly rotating shaft, means controlled at a predetermined position in the rotation of the constantly rotating shaft for sliding the slidable disc toward and from the fixed disc to cause the discs to become first clutched together through the ball and then unclutched, and means controlled at a predetermined position in the rotation of the constantly rotating shaft for periodically returning the ball with the discs clutched thereto to a neutral position after the ball has become displaced from the neutral position in response to the pivotal movement of the indicator.

7. A device of the class described comprising a shaft, a clutch disc fixed to the shaft, a second clutch disc slidable along the shaft and fixed to rotate therewith, an instrument having an indicator pivoted to move freely substantially about the axis of the shaft, a clutch ball loosely suspended from the indicator so as freely to follow the movement of the indicator and disposed between the clutch discs, a constantly rotating shaft, means controlled at a predetermined position in the rotation of the constantly rotating shaft for sliding the slidable disc toward and from the fixed disc to cause the discs to become first clutched together through the ball and then unclutched, two levers, means tending to maintain the levers separated, and means controlled at a predetermined position in the rotation of the constantly rotating shaft for moving the levers toward each other to enclose the ball between them and to move the ball with the discs clutched thereto to a neutral position after the ball has become displaced from the neutral position in response to the pivotal movement of the indicator.

8. A device of the class described comprising a shaft, a deflecting member movable freely of the shaft substantially about the axis of the shaft, means responsive to varying conditions for moving the member to varying degrees, and means for causing the turning of the shaft to a degree determined by the degree of movement of the member.

9. A device of the class described comprising a shaft, a member pivoted to move freely of the shaft in opposite directions substantially about the axis of the shaft, means for moving the member in opposite directions about its pivot, and means for thereupon causing the turning of the shaft in a direction opposite to the direction of movement of the member.

10. A device of the class described comprising a shaft, a member pivoted to move freely of the shaft substantially about the axis of the shaft, means responsive to varying conditions for moving the member about its pivot to varying degrees, a constantly rotating shaft, and means controlled by the constantly rotating shaft for causing the turning of the first-named shaft to a degree predetermined by the degree of pivotal movement of the member.

11. A device of the class described comprising a shaft, a clutch disc fixed to the shaft, a second clutch disc slidable along the shaft and fixed to rotate therewith, an instrument having a deflecting member pivoted to move freely substantially about the axis of the shaft, a clutch element free to follow the movement of the deflecting member, means for periodically sliding the slidable disc toward and from the fixed disc to cause the discs to become first clutched together through the element and then unclutched, and means for periodically returning the element with the discs clutched thereto to a neutral position after the element has become displaced from the neutral position in response to the pivotal movement of the deflecting member.

WILLIAM HERBERT APTHORPE.

DISCLAIMER 1,940,834.—*William Herbert Apthorpe*, London, England. CONTROLLER. Patent dated December 26, 1933. Disclaimer filed October 10, 1934, by the assignee, *Cambridge Instrument Company, Limited*.

Enters this disclaimer to claims 1 and 8 of said patent which are in the following words:

"1. A device of the class described comprising a shaft, a member pivoted to move freely of the shaft substantially about the axis of the shaft, means responsive to varying conditions for moving the member about its pivot to varying degrees, and means for causing the turning of the shaft to a degree predetermined by the degree of pivotal movement of the member."

"8. A device of the class described comprising a shaft, a deflecting member movable freely of the shaft substantially about the axis of the shaft, means responsive to varying conditions for moving the member to varying degrees, and means for causing the turning of the shaft to a degree determined by the degree of movement of the member."

[*Official Gazette October 30, 1934.*]